July 16, 1968  R. R. HAINES  3,392,506
HEAT SEALING MACHINE
Filed Sept. 29, 1965 2 Sheets-Sheet 2
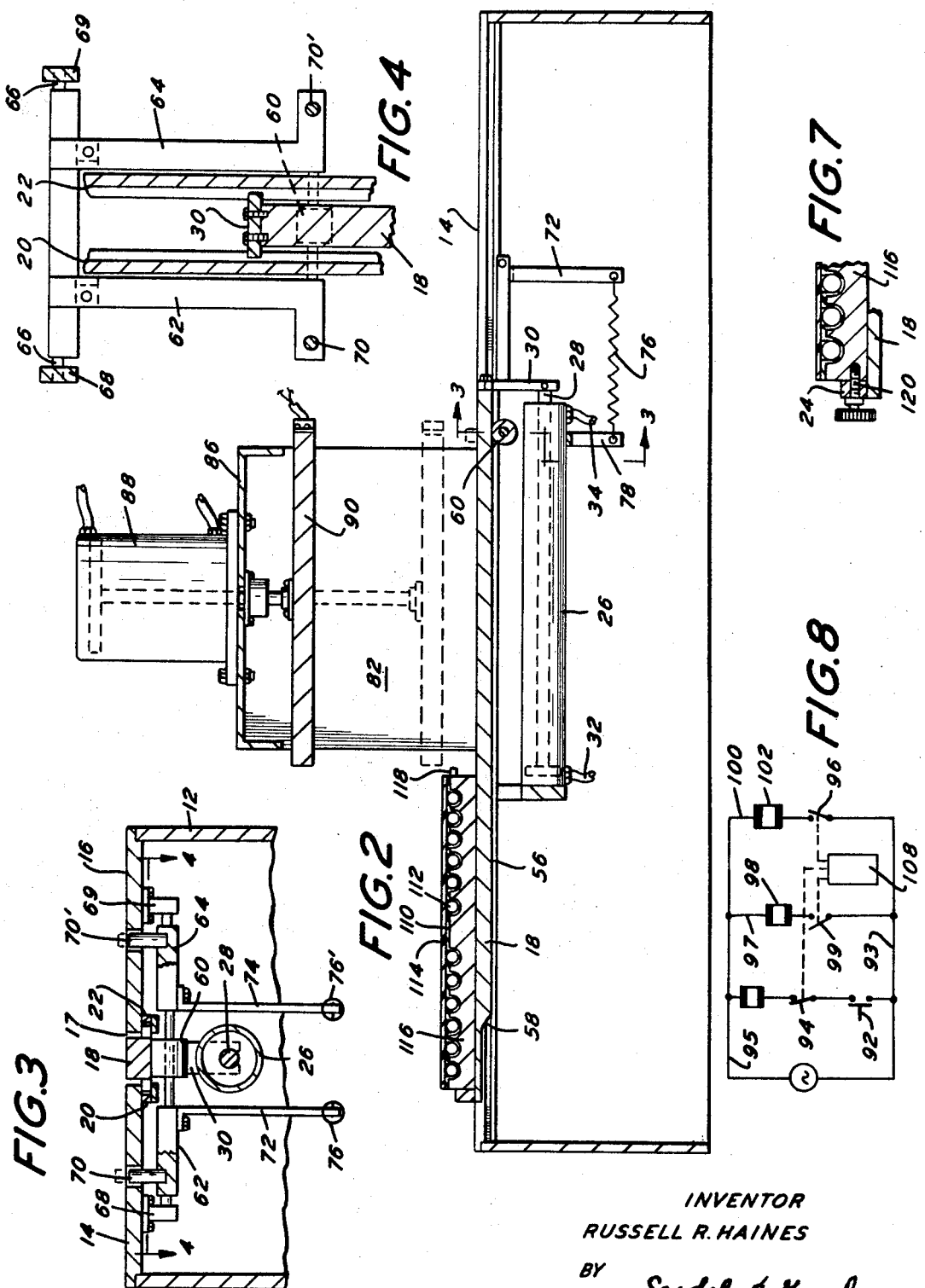
INVENTOR
RUSSELL R. HAINES
BY Seidel & Gonda
ATTORNEYS.

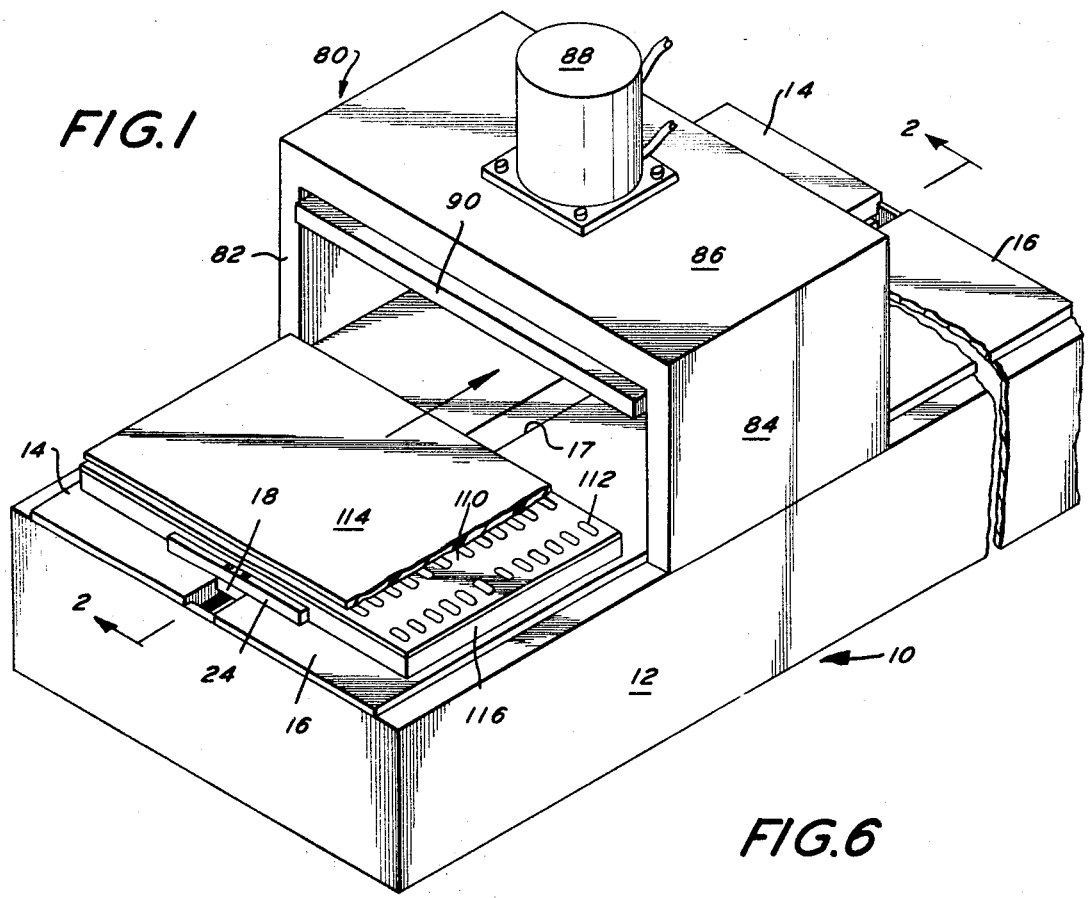

United States Patent Office 3,392,506
Patented July 16, 1968

3,392,506
HEAT SEALING MACHINE
Russell R. Haines, Haddonfield, N.J., assignor to Paper & Corrugated Specialties Company, Philadelphia, Pa., a corporation of Pennsylvania
Filed Sept. 29, 1965, Ser. No. 491,258
6 Claims. (Cl. 53—373)

ABSTRACT OF THE DISCLOSURE

A heat sealing machine is provided having a reciprocatory carriage synchronized for sequentially pushing die plates to a heat sealing position under a vertically movable platen. Limit stops for guide plates and the platen are responsive to carriage movement. Smooth action of movement for the carriage is attained by a combined pneumatic-hydraulic actuator means. The carriage may remain with the die plate at the heat sealing position or may reciprocate to receive a new die plate as desired.

---

This invention relates to a heat sealing machine, and more particularly to a heart sealing machine which is simple, inexpensive, and has a high rate of production.

The heat sealing machine of the present invention is structurally interrelated in a manner whereby it may be operated so that the material to be worked on enters on one side of the machine and exits from an opposite side of the machine or with the material to be worked on entering and exiting on the same side of the machine. A novel motive fluid arrangement is provided so that the high speed reciprocable carriage will have smooth stopping and starting characteristics. The carriage is mounted to move the material to be heat sealed from a loading position to a heat sealing position.

When the material to be heat sealed has been transported to the heat sealing position by the carriage, automatic circuitry actuates the movable platen which effects the heat sealing and then returns to its original position. A limit stop means is provided for the carriage and actuable by the carriage when the carriage approaches the end of its travel.

It is an object of the present invention to provide a novel heat sealing machine.

It is another object to provide a heat sealing machine which is convertible so that it may be operated by a single person or by a plurality of persons.

It is another object of the present invention to provide a heat sealing machine which is simple, efficient, has a high rate of productivity, inexpensive and reliable.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of the heat sealing machine of the present invention.

FIGURE 2 is a longitudinal sectional view taken along line 2—2 in FIGURE 1.

FIGURE 3 is a transverse sectional view taken along line 3—3 in FIGURE 2.

FIGURE 4 is a sectional view taken along line 4—4 in FIGURE 3.

FIGURE 5 is a schematic wiring diagram.

FIGURE 6 is a schematic diagram of the motive fluid circuitry.

FIGURE 7 is a sectional view of one end of the carriage and articles to be heat sealed in accordance with one embodiment to which the apparatus in FIGURES 1–6 may be converted.

FIGURE 8 is a wiring diagram of the electrical circuitry when the carriage and articles to be heat treated are interrelated in accordance with FIGURE 7.

Referring to the drawings in detail, wherein like numerals indicate like elements, there is shown in FIGURE 1 a heat sealing machine designated generally as 10.

The machine 10 includes a housing 12 which preferably is rectangular in configuration with movable doors at opposite ends thereof to facilitate access to the interior. The housing 12 includes an upper surface defined by a pair of horizontally disposed guide plates 14 and 16 spaced from one another by a longitudinally extending slot 17. A carriage 18 is reciprocably supported in the slot 17 by means of a track 20 on the lower surface of plate 14 and a track 22 on the lower surface of plate 16.

The carriage 18 is provided with a crosshead 24 which is reciprocably supported on the upper surface of plates 14 and 16. Carriage 18 is selectively reciprocated within the slot 17 by means of a power cylinder 26 supported by brackets depending from the lower surface of plates 14 and 16. A piston is disposed within the cylinder 26 and connected to a piston rod 28. Piston rod 28 is connected to the forward end of the carriage 18 by means of an arm 30.

Conduits 32 and 34 communicate with the ends of cylinder 26 to facilitate the introduction of motive fluid for effecting the reciprocation of the piston and the piston rod 28 which in turn effects reciprocation of the carriage 18. A speed regulating valve 36 is provided in conduit 32 to regulate the flow of fluid through conduit 32. A similar speed regulating valve 38 is provided in conduit 44.

The end of conduit 32 remote from cylinder 26 is connected to one end of a vessel 40. The lower half of vessel 40 is filled with a motive fluid such as oil. The end of conduit 34 remote from cylinder 26 connects with the lower end of a vessel 44. The lower half of vessel 44 is filled with a motive fluid such as oil.

A motive fluid such as pressurized air is in communication with the upper half of vessel 40 by way of conduit 48. A motive fluid such as pressurized air is in communication with the upper half of vessel 44 by way of conduit 52. The conduits 48 and 52 are connected to a double acting supply and exhaust valve 50 having its inlet connected to a conduit 53 containing a pressure regulator valve 54. When conduits 48 and 53 are in communication with one another, valve 50 places conduit 52 in communication with atmosphere and vice versa.

As shown more clearly in FIGURE 2, the carriage 18 is constructed so as to have a cam surface 56 on its lowermost surface. Cam surface 56 includes an angled portion 58. A cam follower 60 supported by longitudinally extending arms 62 and 64 is maintained in contact with the cam surface 56. Arms 62 and 64 are rotatably supported about a transverse horizontal axis by means of pins 66. The pins 66 are rotatably supported by depending brackets 68 and 69. As shown more clearly in FIGURE 3, the brackets 68 and 69 are supported on the lower surface of the guide plates 14 and 16, respectively.

The arm 62 is provided with a depending leg 72. Arm 64 is provided with a depending leg 74. Springs 76 and 76' apply a bias to effect the rotation of the legs 72 and 74 in a clockwise direction in FIGURE 2 and thereby move limit stops 70 and 70' upwardly through juxtaposed apertures in the guideplates 14 and 16.

The ends of the springs 76 and 76' remote from the legs 72 and 74 are attached to a stationary depending bracket 78. When the cam follower 60 is in the position illustrated in FIGURE 2, the limit stops 70 and 70' are in the solid line position illustrated in FIGURE 3. As soon as the angled portion 58 moves to the right of the cam follower 60 in FIGURE 2, the limit stops 70 and 70' move from their solid line positions in FIGURE 3 to the phantom positions in FIGURE 3.

A channel frame designated generally as 80 is supported by the housing 12. Frame 80 includes sides 82 and 84 supporting a top or roof 86. The frame 80 has an open front and an open back so that material may be moved along the entire length of the slot 17 if desired.

A platen 90 is supported within the frame 80 for reciprocation toward and away from the plane of the guideplates 14 and 16. Platen 90 is preferably a thermal controlled, electrically heated cast aluminum platen. The upper surface of platen 90 is connected by way of a piston rod to the piston disposed within cylinder 88. Conduits are provided for supplying a motive fluid such as air to the cylinder 88 to effect reciprocation of the platen 90.

Referring to the wiring diagram in FIGURE 5, there is illustrated a source coupled across conductors 93 and 95. An on-off switch 92, a microswitch 94, and a solenoid 96 are connected in series across the conductors 93 and 95. In parallel therewith, there is provided a conductor 97 extending between the conductors 93 and 95 and containing a solenoid 98 and a switch 99 in series. A conductor 100 also extends between the conductors 93 and 95. A solenoid 102 and a switch 106 are disposed in series in conductor 100. A timer 108 is coupled to switches 94 and 106.

The articles to be heat sealed may include a layer of transparent polymeric material 110 having a plurality of depressions therein receiving a product 112. The product 112, for example, may be a vitamin pill. A base sheet 114 overlies the layer 110 and the products 112 and adapted to be heat sealed to the layer 110 and thereby cause the products 112 to remain within their recesses. A typical layer 110 may have as many as 200 recesses so that 200 vitamin pills may be encased between the layer 110 and base sheet 114 at the same time.

A dieplate 116 is provided of sufficient size so as to support the layer 110 on its uppermost surface. The upper surface of dieplate 116 is provided with a plurality of recesses corresponding in number and location to the recesses or bubbles on the layer 110. The die plate 116 is of sufficient length so that it may pass between the sides 82 and 84 on the frame 80 and is slightly greater in configuration than the platen 90. Dieplate 116 is supported by the upper surface of guideplates 14 and 16 in abutting contact with the crosshead 24.

The operation of the machine 10 is as follows:

Layer 110 made from a transparent polymeric material having a plurality of individual bubbles or recesses is made in accordance with conventional equipment. A product such as a vitamin pill is provided in each recess after first placing the layer 110 on the dieplate 116. Thereafter, a base sheet 114 made from a material such as aluminum foil is placed over the layer 110 and the products 112.

In its inoperative position, the carriage 18 is in the position illustrated in FIGURES 1 and 2. The products or articles to be heat sealed will be positioned as shown in FIGURES 1 and 2. The on-off switch 92 is then manually closed. The microswitch 94 is normally closed. Hence, solenoid 96 is activated to operative valve 50 so as to place conduit 52 in communication with atmosphere and conduit 48 in communication with conduit 53. The pressurized air introduced into vessel 40 causes the oil 42 to flow through conduit 32 and move the piston rod 28 to the right in FIGURES 2 and 6. As the piston rod 28 moves to the right, the carriage 18 is moved to the right in these figures.

As soon as the cam follower 60 moves along the angled portion 58, the pins 70 and 70' are caused to move upwardly through the apertures in the guideplates 14 and 16 and thereby limit the extent of movement of the dieplate 116 so as to properly position the articles to be heat treated beneath the platen 90.

Simultaneously with the upward movement of limit stops 70 and 70' the carriage 18 trips the microswitch 94 thereby moving the same to an open disposition. Microswitch 94 is directly coupled to switch 99. Hence, when switch 94 is opened, switch 99 is closed. As soon as switch 99 closes, solenoid 98 causes the valve 50 to place conduit 48 in communication with atmosphere and places conduits 52 and 53 in communication with each other. The introduction of pressurized air into vessel 44 causes the oil 46 to move the piston rod 28 to the left in FIGURES 2 and 6. At the same time, the timer 108 will be initiated.

As soon as the piston in cylinder 28 has moved sufficiently to the left in FIGURE 6 so as to obscure the port leading to conduit 32, a small amount of oil will be trapped in the left-hand end of cylinder 26 which cannot be compressed and therefore the carriage 18 will come to a stop and be held in such position by the pressure of oil 46. After a delay of about one second subsequent to actuation of the timer 108 by switch 94, timer 108 will close switch 106 thereby activating solenoid 102. Solenoid 102 is connected to a supply and exhaust valve (not shown) for supplying and exhausting motive fluid to the cylinder 88. Hence, as soon as switch 106 is closed, solenoid 102 causes motive fluid to be introduced into cylinder 88 to move the platen 90 downwardly to its phantom position in FIGURE 2 wherein it heat seals the base sheet 114 to the layer 110. The products 112 are below the plane of the base sheet 14 and therefore are not effected by the heat seal.

Depending upon the size and thickness of material involved, the time required to effect the heat sealing action may be varied. Thus, using aluminum foil as the base sheet 114 having a thickness of about .003 inch and using layer 110 with a thickness of about .008 inch, the heat sealing operations may be effected in about three seconds. As soon as the timer 108 times out, it causes switch 94 to close and switch 106 to open. When switch 94 closes, switch 99 opens since they are coupled together.

Since switch 92 is an on-off switch, it moves to an off position as soon as pressure is released. Hence, the cycle will not repeat itself until switch 92 is again moved to an on position. As soon as switch 106 opens, the solenoid 102 is deactivated and motive fluid is introduced into cylinder 88 to raise the platen 90. The entire cycle just described takes approximately five seconds. During the heat sealing operation, a new dieplate 116 having on its upper surface a lever 110 and base sheet 114 is positioned in front of the crosshead 24 and supported by the guideplates 14 and 16.

As soon as the platen 90 has been raised, the operator will then press on the on-off switch 92 to repeat the cycle. As the new dieplate moves forward, it will push the existing dieplate 116 from a position beneath the platen 90 so that it is supported by the guideplates 14 and 16 in a position to the right of the frame 80 in FIGURE 2. To insure that sufficient space will exist between the two dieplates, for accommodation of the limit stops 70 and 70', the front end of the dieplates may be provided with a pair of pusher pins 118. In the above cycle, using dieplates adapted to accommodate 200 of the products 112, approximately 120,000 of the products can be heat sealed in large sheets per hour. Only two operators are needed, one at the front end of the machine to correctly position dieplates 116 and operate the on-off switch 92; the other operator is at the opposite end of the machine to receive the heat sealed products and separate the same from the dieplates 116 so as to enable the heat sealed products supported by dieplates to be sequentially pushed through the frame 80.

If it is desired to convert the machine for operation by only a single operator, two modifications are necessary. The first modification is to removably clamp or connect the dieplate 116 to the crosshead 24 on the carriage 18. Thus, see FIGURE 7 wherein a bolt or screw 120 is supported by the crosshead 24 for removably connecting the crosshead to the dieplate 116. The screw 120 may be provided with an enlarged head having a milled or grooved outer periphery to facilitate ease of actuation. The second modification involves a slight reorganization of the circuitry as illustrated in FIGURE 8 wherein the switch 99 is coupled to the timer 108 for actuation thereby approximately one second after the platen 90 is caused to move upwardly. Thus, it will be noted that switch 99 is now responsive to the timer 108 instead of the microswitch 94.

In the thusly converted machine 10, only a single operator is needed to position the dieplates in the loading area, cause the dieplates to be moved by the carriage 18 to the heat sealing position, and cause the carriage to reciprocate back to its loading position approximately one second after the platen 90 moves upwardly. Thereafter, the operator will remove the heat sealed articles and reposition a new layer 110 having products 112 received within the recesses thereon, with a base sheet 114 overlying the same. Thereafter, the operator will close on-off switch 92 and cause the cycle to be repeated. It will be noted that only a single dieplate 116 is needed for this modification of the machine 10. Except as described above, this modification of machine 10 is identical with the one first described above. Hence, a retailed description of the operation is not deemed necessary.

The base sheet 114 is preferably aluminum foil since this will enable the heat sealed articles to be hermetically packaged in a manner which enables the products 112 to be easily removed. Removal of products 112 may then be effected by pushing on the bubble of layer 110 until product 112 ruptures the portion of bare sheet 114 juxtaposed thereto. The amount of energy required to effect such a rupture is so slight that it can be accomplished by a housewife or even a child.

The present invention may be embodied in other specific forms without departing from the spirit or essential attributes thereof and, accordingly, reference should be made to the appended claims, rather than to the foregoing specification as indicating the scope of the invention.

I claim:

1. A heat sealing machine comprising a housing, a carriage reciprocally supported by said housing for horizontal movement from a loading position to a heat sealing location, a platen supported by said housing at said heat sealing location for up and down movement between an inoperative position and a heat sealing position, motor means and circuitry connected to said carriage and platen for selectively moving said carriage between said locations and for moving said platen to its heat sealing position when the carriage has positioned articles to be heat sealed at the heat sealing position, said motor means including a hydraulic cylinder having a piston rod connected to said carriage, a separate vessel connected to opposite ends of said cylinder and partially containing a hydraulic liquid, and means for selectively and alternatively placing the remainder of each vessel in communication with a source of pressurized air to effect reciprocation of the piston rod and carriage.

2. A machine in accordance with claim 1 wherein said circuitry includes means to move the carriage from its heat sealing location to the loading location only after the platen has started to move from its heat sealing position to its inoperative position.

3. A machine in accordance with claim 1 including means for converting the machine so that in one arrangement the carriage will move from the heat sealing position to a loading position only after the platen starts to move upwardly from its heat sealing position and in an arrangement so that the carriage will move to its loading position while the platen is still in its heat sealing position.

4. A heat sealing machine comprising a housing, a carriage reciprocally supported by said housing for movement from a loading location to a heat sealing location, a platen supported by said housing at said heat sealing location for up and down movement between an inoperative position and a heat sealing position, motor means and circuitry connected to said carriage and platen for selectively moving said carriage between said locations and moving said platen to its sealing position when the carriage has positioned articles to be heat sealed at the heat sealing location, limit stop means supported by the housing, said limit stop means having an operative and an inoperative position, and means structurally interrelating the carriage and limit stop means so that the limit stop means will move to its operative position in response to movement of the carriage.

5. A machine in accordance with claim 4 including a cam follower connected to the limit stop means, said cam follower being in contact with a cam surface on the carriage.

6. Apparatus for heat sealing sheets of aluminum foil to a polymeric plastic material comprising a housing, a carriage reciprocally supported by the housing adjacent an upper horizontal surface of the housing, a die plate supported by said surface, said carriage being supported for reciprocatory movement for pushing the die plate from a loading location on the housing to a heat sealing location on the housing, a platen supported by said housing at said heat healing location for movement between an upper inoperative position and a lower operative heat sealing position, motor means connected to said carriage to effect smooth stopping and starting of said carriage, said motor means including separate vessels partially filled with a liquid, each vessel being in communication with a power cylinder forming a part of said motor means, limit stop means on said housing for said guide plate, said limit stop means being responsive to movement of said carriage for effecting a stopping of the die plate when articles to be heat sealed are properly positioned below the platen at the heat sealing location, and circuitry for effecting movement of the carriage and platen in timed relationship wherein the platen will not move downwardly to its heat sealing position until articles to be heat sealed are positioned therebelow, and means for causing heat sealed articles to be moved from the heat sealing location by the carriage.

References Cited

UNITED STATES PATENTS

| 3,092,945 | 6/1963 | Wizelman | 53—373 |
| 3,118,262 | 1/1964 | Messick | 53—373 X |
| 3,170,275 | 2/1965 | Rohdin et al. | 53—373 |
| 3,279,150 | 10/1966 | Watts et al. | 53—373 X |
| 3,316,690 | 5/1967 | Straub et al. | 53—373 X |

TRAVIS S. McGEHEE, *Primary Examiner.*